United States Patent
Heyn et al.

(10) Patent No.: US 8,181,757 B2
(45) Date of Patent: May 22, 2012

(54) ADJUSTABLE DAMPING VALVE WITH A FAIL-SAFE DAMPING FORCE CHARACTERISTIC

(75) Inventors: Steffen Heyn, Niederwerrn (DE); Bernd Zeissner, Gaibach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 898 days.

(21) Appl. No.: 11/904,824

(22) Filed: Sep. 28, 2007

(65) Prior Publication Data

US 2008/0078634 A1  Apr. 3, 2008

(30) Foreign Application Priority Data

Sep. 30, 2006 (DE) .......................... 10 2006 046 609

(51) Int. Cl.
*F16F 9/34* (2006.01)

(52) U.S. Cl. ............. 188/322.13; 188/266.2; 188/266.5; 188/266.6; 188/282.3; 188/313; 188/314; 188/315; 188/319.1; 188/322.2; 137/614.13; 137/614.14; 137/614.2; 137/601.14; 137/601.2; 251/54; 251/129.15

(58) Field of Classification Search ............. 188/322.13, 188/266.1, 275, 282.6, 282.8, 282.9, 266.5–266.6; 251/129.01, 129.15; 137/599.18
See application file for complete search history.

(56) References Cited

U.S. PATENT DOCUMENTS

| | | | |
|---|---|---|---|
| 4,723,640 A | 2/1988 | Beck | |
| 4,854,429 A * | 8/1989 | Casey | 188/266.2 |
| 4,880,086 A * | 11/1989 | Knecht et al. | 188/266.6 |
| 5,085,299 A * | 2/1992 | Spiess et al. | 188/266.5 |
| 5,409,088 A * | 4/1995 | Sonsterod | 188/282.3 |
| 5,413,196 A | 5/1995 | Förster | |
| 5,699,885 A | 12/1997 | Förster | |
| 6,003,644 A * | 12/1999 | Tanaka | 188/266.5 |
| 6,135,250 A * | 10/2000 | Forster et al. | 188/266.5 |
| 6,371,262 B1 | 4/2002 | Katou et al. | |
| 6,405,743 B1 * | 6/2002 | Spryshak et al. | 137/1 |
| 7,448,479 B2 * | 11/2008 | Fukuda et al. | 188/322.2 |
| 2006/0054434 A1 * | 3/2006 | Fukuda et al. | 188/313 |

FOREIGN PATENT DOCUMENTS

| | | |
|---|---|---|
| DE | 35 18 327 | 11/1986 |
| DE | 38 44 642 | 5/1990 |
| DE | 39 17 064 | 11/1990 |
| DE | 41 04 110 | 8/1992 |
| DE | 42 08 886 | 9/1993 |
| DE | 44 01 689 | 7/1995 |
| DE | 44 23 526 | 12/1995 |
| EP | 0 616 146 | 9/1994 |
| EP | 1 437 539 | 7/2004 |

OTHER PUBLICATIONS

Examination Report dated Sep. 21, 2007 issued for the corresponding German Patent Application No. 10 2006 046 609.

* cited by examiner

*Primary Examiner* — Robert A Siconolfi
*Assistant Examiner* — San Aung
(74) *Attorney, Agent, or Firm* — Cozen O'Connor

(57) ABSTRACT

An adjustable damping valve including an actuator, which exerts an actuating force on a valve body against the force of a spring to influence the throttle cross section which determines the damping force, where an emergency valve is connected in parallel with the throttle cross section with respect to the flow direction of the damping medium, where the two control surfaces of the valve body move in the axial direction and can thus can come to rest alternately on the two valve seating surfaces, and where the valve body is divided into two parts in the longitudinal direction, and each valve body assembly has its own control surface.

7 Claims, 3 Drawing Sheets

ADJUSTABLE DAMPING VALVE WITH A FAIL-SAFE DAMPING FORCE CHARACTERISTIC

BACKGROUND OF THE INVENTION

1. Field of the Invention

The invention relates to an adjustable damping valve.

2. Description of the Related Art

Vibration dampers with adjustable damping force often have an electromechanical actuator for changing the cross section of a valve opening. The concept of safety entered into the development of adjustable vibration dampers at an early point, and this led to the idea of equipping the actuator with a spring, which, if the current were interrupted, would act on a valve body to minimize the cross section of the valve opening. Reference can be made to DE 35 18 327 C2 an example. The goal was to achieve a high damping force setting, so that sufficient damping force would be available for all damping movements.

The percentage of time during which a damper acts with maximum damping force is comparatively small during normal driving. In the case of an actuator with the design according to DE 35 18 327 C2, there is the disadvantage that a large amount of actuating current is required to achieve a "soft" damping force setting, because the force of the magnetic coil must act against the force of the spring. The stronger the force of the magnetic coil, the greater the open cross section of the adjustable damping valve and the lower the obtained damping force, which leads to comfortable driving behavior.

The disadvantages associated with the design principle of this actuator led to the idea that an intermediate damping force characteristic might be better for the emergency operating mode of the adjustable vibration damper. Various design approaches have been taken, including that described in DE 39 17 064 A1.

In the variant according to FIG. 1 of DE 39 17 064 A1, a valve body 50 is used, which has two control parts 75, 76, which cooperate with valve seats 86, 88. The actuator 44, 46 must exert an opening force against the force of the restoring spring 82 in order to hold the control parts 75, 76 in the middle position for the softest damping force characteristic. When the actuator fails, the control part 76 will lie on the valve seat 88 and thus minimize the outflow from the pressure space 64. The slanted throttle point 108 and a throttle point provided with an emergency valve are then available for the outflow of the damping medium from the pressure space.

The variant according to FIG. 2 of DE 39 17 064 A1 functions in a very similar way. The difference is that a ball is used as the valve body. In addition, the throttle point 108 connected hydraulically in parallel with the valve body extends in the longitudinal direction through an intermediate wall in the damping valve. Common to both designs, however, is that, although they describe a functional principle, they do not tell how to overcome the considerable difficulties involved in achieving a technical realization of that principle, because the amount of space which is available is very small, and the degree of precision required for the components is very high. The two figures do not show the outlines of any components which make it possible to install, for example, the valve body 50.

SUMMARY OF THE INVENTION

An object of the present invention is to realize a manufacturable variant for an adjustable damping valve with an emergency operating mode characteristic which deviates from a maximally high or low damping force setting.

According to the invention, this object is accomplished in that the valve body is divided into two parts in the longitudinal direction, and each valve body assembly has a control surface.

As a result of the two-part design, the valve body can pass through an opening, on which the valve seating surfaces for the valve body are provided, and the parts can nevertheless be easily assembled.

In another advantageous embodiment, the valve body assembly determining the emergency operating position has a fastening pin, which passes through a valve disk on which the valve seating surfaces are located. The fastening pin can be designed with a fastening thread, or the two valve body assemblies can be attached to each other by a weld or by a press-fit.

According to another advantageous embodiment, the valve body assembly has an axial channel for the damping medium in emergency operating mode.

The fastening pin is designed with a receiving sleeve for the axial channel, and a valve sleeve for an emergency valve is located in the receiving sleeve. As a result of the nested design, it is possible to use components with very simple contours.

The valve sleeve has a bottom piece with an emergency valve seating surface and an axial support surface for an emergency valve spring.

A simple method of fixation is to press the valve sleeve into the receiving sleeve.

It is provided that the spring, which acts against the force of the actuator, is supported on a threaded disk of the damping valve housing. The spring produces pretension within the threaded connection of the threaded disk and thus serves additionally to lock the thread of the threaded disk.

The valve seating surfaces are provided on a valve seating disk, which can be removed from the damping valve housing. The valve seating disk is held in place against a wall of the damping valve housing by a pretensioning spring. No welding or setting measures of any kind are required to fasten the comparatively delicate valve disk inside the damping valve housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is to be explained in greater detail below on the basis of the following description of the figures.

DETAILED DESCRIPTION OF THE PREFERRED EMBODIMENTS

Figure 1:
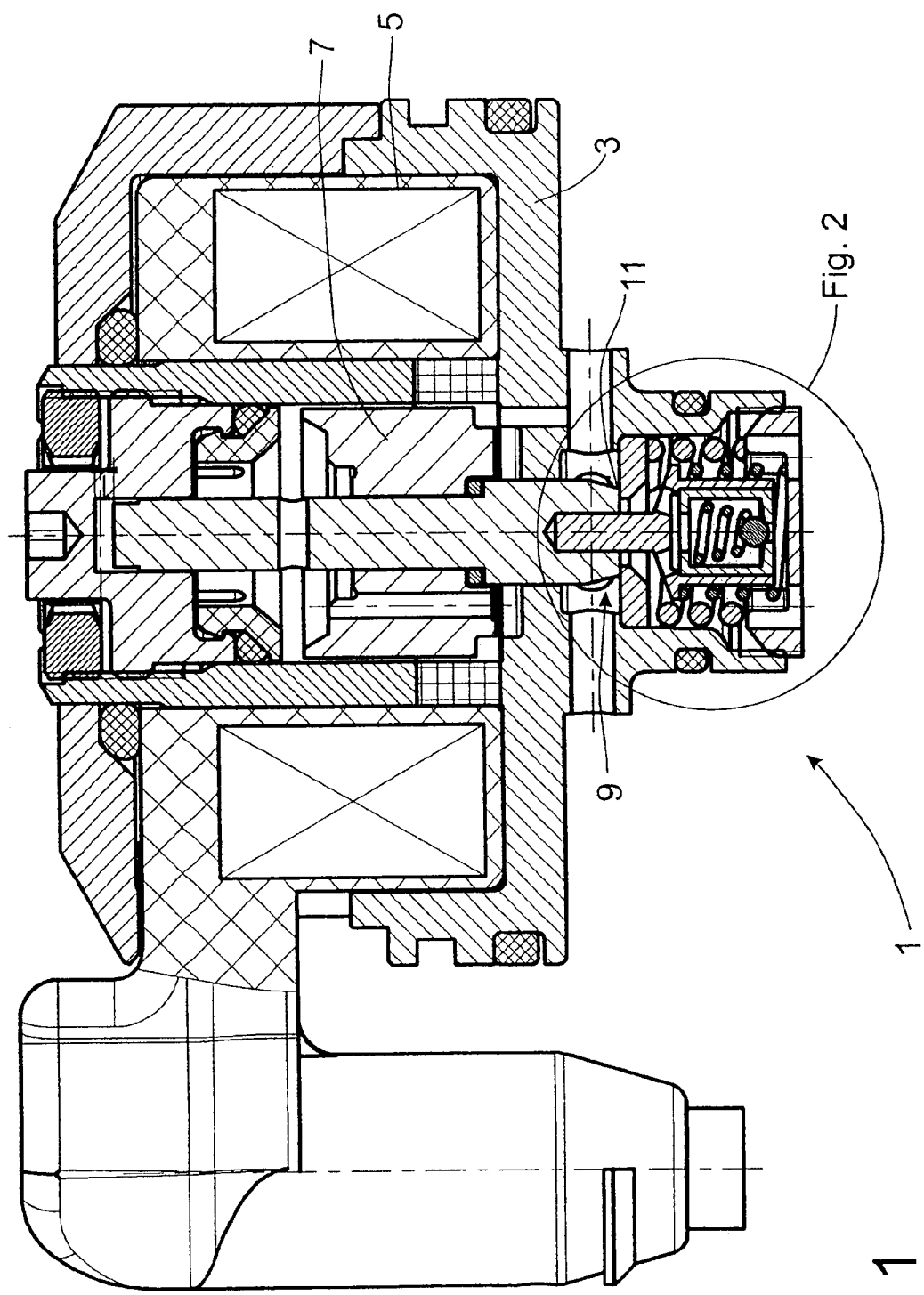
FIG. 1 shows a cross section of an adjustable damping valve.

FIG. 1 shows an adjustable damping valve 1 in a design with a pilot valve with a valve housing 3, in which a magnetic coil 5 with an axially movable anchor forms an actuator 7. The actuator 7 acts on a valve body 9, which determines a throttle cross section 11 and thus changes the outflow from a pressure space (not shown) forming part of a main damping valve. The less the throttling of the outflow, the smaller the pressure-dependent closing force on the valve body of the main-stage valve. Reference can be made to DE 41 04 110 A1 by way of example.

Figure 2:
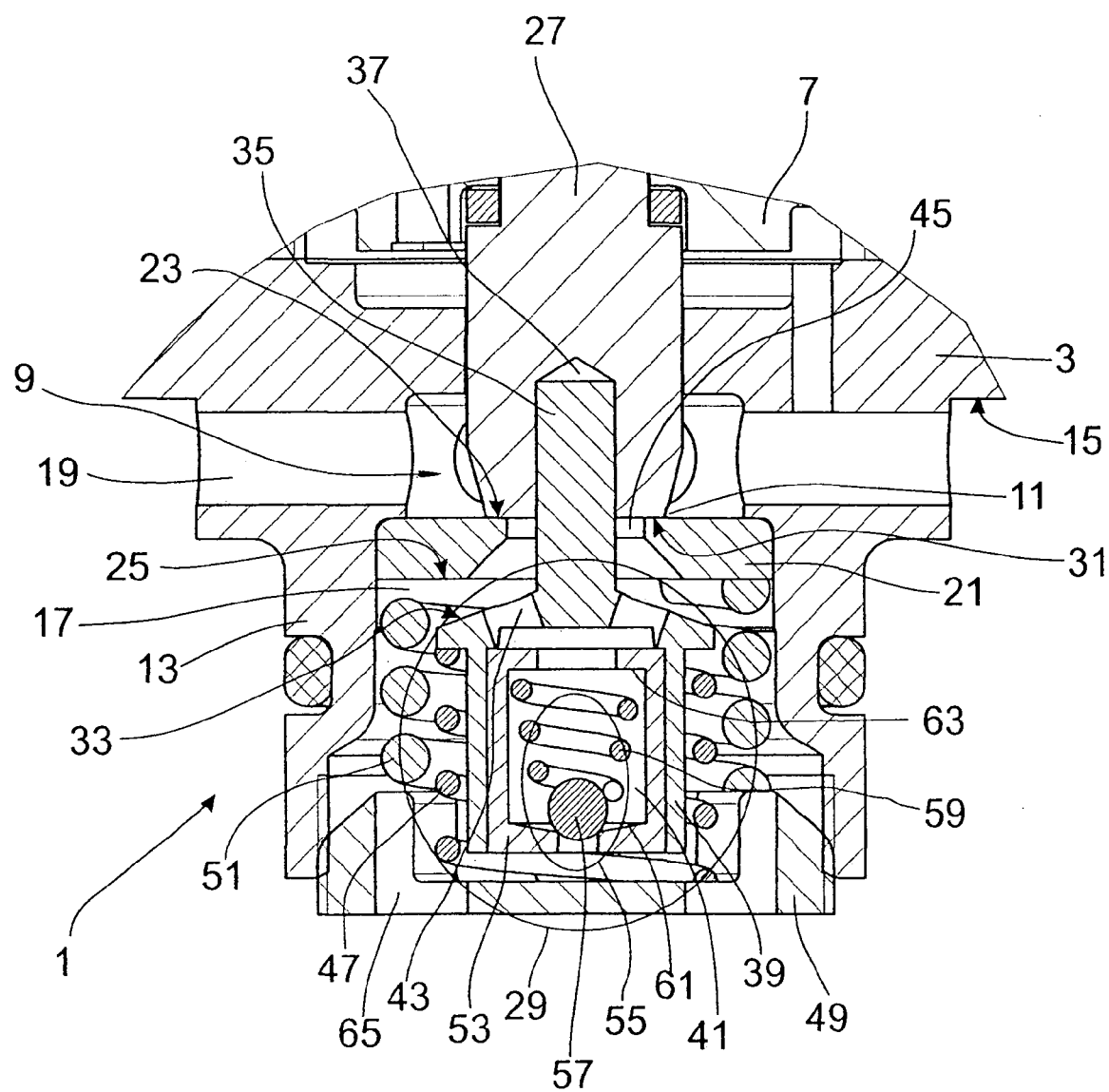
FIG. 2 shows an enlarged view of part of FIG. 1.

FIG. 2 is limited to showing the lower end of the valve body 9. The valve housing 3 has a cup-shaped base body with a sleeve-like extension 13. Between the extension 13 and the bottom part 15 of the base body, there is a through-opening 17, to which radial discharge openings 19 are connected. The valve body 9 is supported so that it is free to move back and forth in the axial direction and passes through a ring-like valve seating disk 21, which rests on the base body. The valve seating disk 21 has a valve seating surface 23, 25 on each cover surface for the valve body 9. The valve body 9 is divided into two parts in the longitudinal or axial direction, so that two valve body assemblies 27, 29 are present, each of which has its own control surface 31, 33. Depending on the axial position of the valve body 9, these control surfaces can rest alternately on the valve seating surfaces 23, 25 of the valve seating disk 21.

The valve body assembly 29, which determines the emergency operating mode position, has a fastening pin 35, which passes through the valve seating disk 21 and engages in a blind hole 37 in the second valve body assembly 27. The fastening pin 35 can have, for example, a fastening thread, or it can be welded, adhesively bonded, or press-fitted into the blind hole 37.

Adjoining the fastening pin 35 is a receiving sleeve 39, in which an axial channel 41 for the flow of damping medium during emergency operation is provided. On the side facing the valve seating disk 21, the receiving sleeve 39 has the conical control surface 33, which can come to rest against the lower valve seating surface 25. At least one opening 43 is provided in the control surface 33; this opening 43 extends at least partially in the radial direction inside and leads to a through-opening 45 in the valve seating disk 21. A compression spring 47 acts on a circumferential collar of the receiving sleeve 39. This spring is supported axially on a threaded disk 49, which in turn is screwed into the sleeve-shaped extension 13 of the damping valve housing 3. The compression spring 47 acts against the force of the actuator 7.

A pretensioning spring 51, which holds the axially movable valve seating disk 21 against the bottom part 15 of the cup-shaped base body, is supported on the threaded supporting disk 49. The pretensioning force of the pretensioning spring 51 is greater than the maximum actuating force of the actuator 7, so that the valve seating surfaces 23, 25 are always held on the valve housing 3.

A valve sleeve 53 for an emergency operating valve 55 is installed in the receiving sleeve 39. The emergency valve comprises a closing body 57, which is spring-loaded by an emergency valve spring 59. The bottom part of the valve sleeve 53 has an emergency valve seating surface 61 and the top part has an axial support surface 63 for the emergency valve spring 59. The valve sleeve 53 is pressed into the receiving sleeve 39.

Depending on how the main-stage valve is designed, during normal operation the actuating force acts against the compression spring 47 of the valve assembly 27. Thus the valve assembly 27 can close the throttle cross section 11 between the valve seating surface 23 on the top side of the valve seating disk 21 and a control surface 31 on the valve assembly 27 as increasing amounts of current are supplied.

In the case of a main-stage valve in which the pressure-actuated surfaces in the closing direction are larger than the pressure-actuated surface in the opening direction, a different operating behavior is observed. In a design of this type, the valve body 9 maintains a constant functional distance from the valve seating surface 23, i.e., the height of the throttle cross section 11 remains constant. The variable current being supplied to the actuator 7 has the effect of changing the force acting on the valve body 9, as a result of which a new difference is produced between the pressure acting on the pressure-actuated surfaces of the main-stage valve body in the opening direction and the pressure acting in the closing direction, where this pressure difference in turn determines the lifting stroke of the main-stage valve body.

Figure 3:
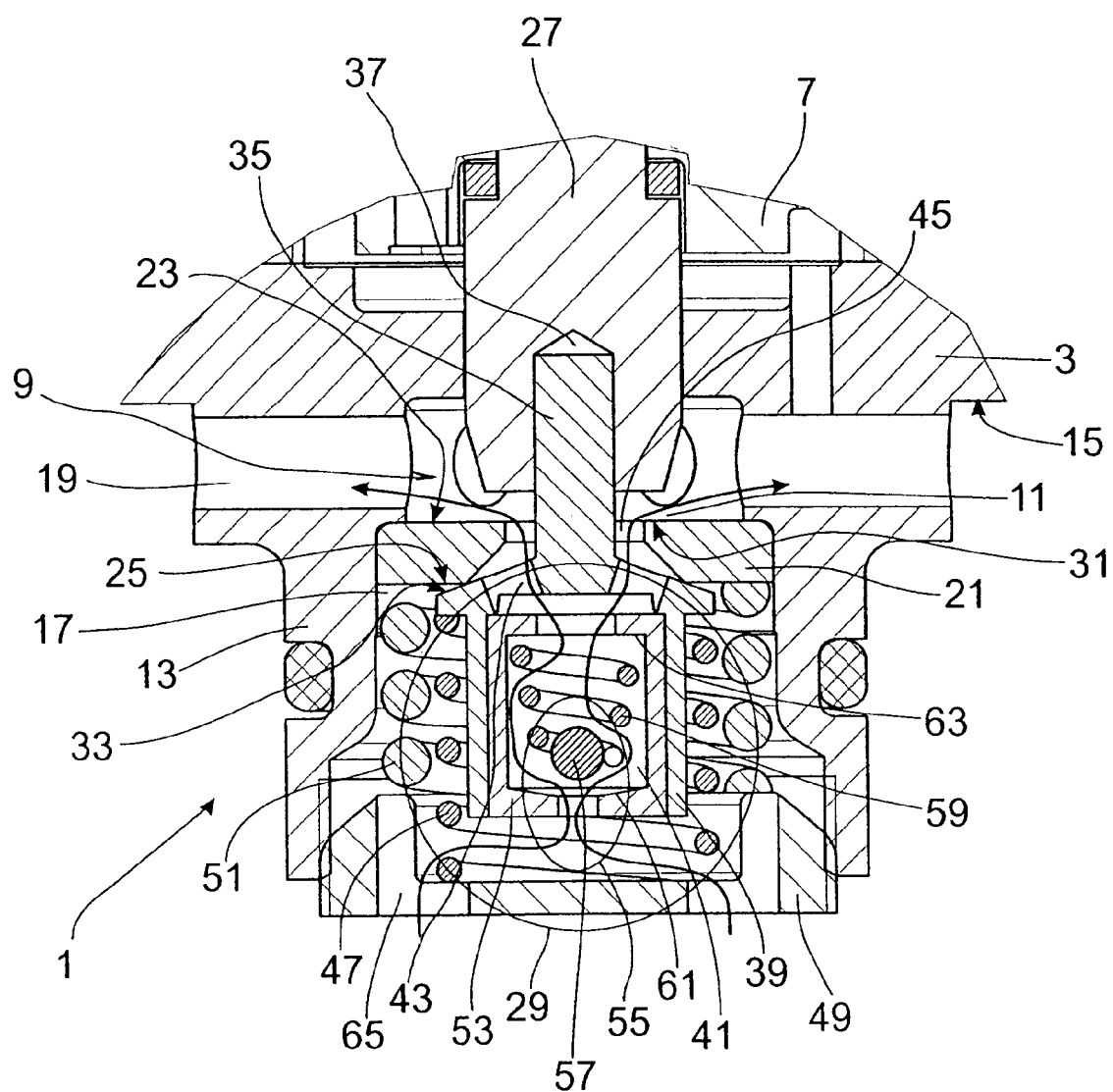
FIG. 3 shows the emergency operating mode position.

In FIG. 2, the throttle cross section is shown completely closed against the force of the spring 47 at maximum current to the actuator 7. If the actuator 7 or the power supply fails, then the compression spring 47 shifts the entire valve body 9 axially, so that the control surface 33 of the valve assembly 29 now rests against the bottom surface of the valve seating disk 21, as shown in FIG. 3. The damping medium entering via the openings 65 in the threaded disk 49 cannot flow externally around the receiving sleeve 39 through the valve seating disk 21, because this flow route is blocked by the receiving sleeve 39 and the control surface 33. As a function of the pressure acting on the closing body 57 of the emergency valve 55, this closing body 57 can be lifted against the force of the emergency valve spring 59 from the emergency valve seating surface 61, and the damping medium can escape through the axial channel 41 and onward through the valve seating disk 21 to the discharge openings 19. The dimensions of the pressure-actuated surface of the closing body 57 in correspondence with the cross-sectional area of the opening in the bottom of the valve sleeve and the pretensioning force of the emergency valve spring 59 can be used to define any desired damping force characteristic for the adjustable damping valve for emergency operation, because the cross sections of the axial channel 41 or of the openings 43 are much larger than the pressure-actuated surface of the closing body 57.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. An adjustable damping valve comprising:
a housing comprising a first valve seating surface and a second valve seating surface;
a valve body in the housing, the valve body being divided axially into a first valve body assembly comprising a first control surface and a second valve body assembly comprising a second control surface and a fastening pin extending through a valve seating disk, wherein the valve seating disk is removable from the housing, and said valve body and housing defining a cross-section of a throttle therebetween;

a spring acting on the valve body;

an actuator configured to exert an adjusting force on the valve body against a force of the spring to influence the cross section of the throttle which determines a damping force;

a main valve comprising one of the first and the second valve body assemblies configured to be coupled to a pressure space, wherein an outflow from the pressure space is varied by the throttle cross section, wherein as a throttling of the outflow decreases a pressure-dependent closing force on the one of the first and the second valve body assemblies of the main valve decreases;

a separate emergency valve connected in parallel with the cross section of the throttle with respect to a flow direction of the damping medium;

a pre-tensioning spring holding the valve seating disk in place against a wall of the housing, wherein when the valve body moves axially, the first control surface and the second control surface can alternately contact the first valve seating surface and the second valve seating surface, wherein the first and second valve seating surfaces are formed on the valve seating disk, and wherein the second valve body assembly determining an emergency operating mode when the second control surface contacts the second valve seating surface.

2. The adjustable damping valve of claim 1, wherein the second valve body assembly has an axial channel for the damping medium in the emergency operating mode.

3. The adjustable damping valve of claim 2, wherein the second valve body assembly further comprises a receiving sleeve attached to the fastening pin and surrounding the axial channel.

4. The adjustable damping valve of claim 3, wherein the emergency valve comprises a valve sleeve disposed in the receiving sleeve.

5. The adjustable damping valve of claim 4, wherein the valve sleeve comprises an emergency valve seating surface at one end and an axial support surface at the other end, the emergency valve further comprising an emergency valve spring supported by the axial support surface.

6. The adjustable damping valve of claim 4, wherein the valve sleeve is pressed into the receiving sleeve.

7. The adjustable damping valve of claim 1, further comprising a supporting disk threaded into the housing, the spring comprising a compression spring supported by the supporting disk.

* * * * *